Patented July 2, 1935

2,006,541

UNITED STATES PATENT OFFICE 2,006,541

MANUFACTURE OF ALIPHATIC ANHYDRIDES

Henry Dreyfus, London, England

No Drawing. Application May 25, 1929, Serial No. 366,096. In Great Britain June 7, 1928

22 Claims. (Cl. 260—123)

This invention relates to the manufacture of aliphatic anhydrides from aliphatic acids and especially to the manufacture of acetic anhydride from acetic acid.

It is known that aliphatic anhydrides can be prepared by subjecting vapors of aliphatic acids to thermal decomposition and various catalysts have been proposed for the reaction.

I have now found that phenols and their aliphatic acid esters are highly useful catalysts for the reaction.

According to the invention therefore I produce aliphatic anhydrides (and especially acetic anhydride) by subjecting vapors of aliphatic acids (and especially acetic acid) to thermal decomposition in presence of one or more phenols or aliphatic acid esters of phenols.

In performing the invention I preferably employ one or more of the following phenols or aliphatic acid esters of phenols:—phenol, one or more cresols or xylenols, or acetates of such phenols, though it is of course understood that I in no wise limit myself to these particular examples.

The reaction may be performed at temperatures of from about 250° to 1000° C. and preferably at temperatures of from about 300° to 700° C.

The reaction may be performed in any convenient manner. For instance, a mixture of acetic acid or other aliphatic acid and one or more phenols or aliphatic acid esters of phenols may be passed in vapor form in a rapid stream through a reaction zone heated to the desired temperature. Such reaction zone may be formed from tubes (or other form of apparatus) made from or lined with copper, silica, earthenware or other suitable material and may, if desired, be filled with or otherwise contain, balls, granules or pieces of pumice, kieselguhr, carborundum or other filling materials. Further if desired, the reaction zone may contain catalysts hitherto known to promote the scission of aliphatic acids into their anhydrides.

The mixtures of the aliphatic acids and the phenols or aliphatic acid esters of phenols may be made in any suitable way. Conveniently they may be prepared by simple admixture in the vapor form or by passing vapors of the aliphatic acid in a regulated stream through the hot or boiling phenols or aliphatic acid esters of phenols. In performing the reaction I preferably employ mixtures containing about 1% to 10% of the phenols or aliphatic acid esters of phenols, though I in no wise limit myself in this respect.

Instead of first mixing the phenols or aliphatic acid esters of phenols with the aliphatic acid vapor I may, for instance, inject the phenol or aliphatic acid esters of phenol directly, in liquid or vapor form, into the heated reaction zone, through which the aliphatic acid vapor is caused to pass in a rapid stream.

It is to be understood that the invention is not limited as to the pressure employed, as the process of the invention may be performed under ordinary atmospheric pressure, or under reduced pressure or "vacuum" or under higher pressures than atmospheric, for instance, under pressures of from 3 to 10 atmospheres or more.

The anhydride produced by the process may be separated from the reaction gases or vapors in any suitable way. The anhydride separated or recovered from the reaction gases or vapors may if desired or required be purified by any suitable means. For instance, it may be distilled from an anhydrous acetate (e. g. anhydrous sodium acetate).

In the recovery or separation of the anhydride from the reaction vapors the reaction gases or vapors are preferably not submitted to simple condensation as such condensation involves hydrolysis and consequent loss of anhydride, but they are preferably treated to separate the anhydride from the water vapor present or formed in the reaction. For instance, the gases or vapors from the reaction zone may be subjected to fractional condensation for example by leading them up through one or more fractionating columns maintained at a temperature or temperatures intermediate between the boiling points (under the conditions of pressure obtaining) of the anhydride and of water, whereby the anhydride is condensed and the water passes on in vapor form.

Or, for instance, the reaction gases or vapors may, if desired, be passed through one or more solvents for the anhydride which are insoluble in water and which have higher boiling points than water (preferably of higher boiling point than the anhydride) such solvents being employed at temperatures intermediate between the boiling points (under the conditions of pressure obtaining) of water and of the anhydride, whereby the anhydride is condensed or absorbed and the water escapes in vapor form. As examples of such solvents may be mentioned chlorbenzene, paradichlorbenzene, benzylether, tetrachlorethane, paraffin oil, triacetin, phenetol, anisol, one or more cresols, and paracresyl acetate.

Or, for instance, the reaction gases or vapors may, if desired, be subjected to condensation by the process described in U. S. application S. No. 284,566 filed June 11, 1928, that is to say the anhydride may be condensed from the reaction vapors whilst carrying away the water vapor by the vapor of one or more "entraining" liquids. In such form of execution the reaction vapors are preferably mixed, after leaving the reaction zone, with the vapors of the entraining liquid or liquids at a temperature below the boiling point (under the conditions of pressure obtaining) of the anhydride. Conveniently such mixing may be performed by introducing the reaction vapors (which should not be allowed to cool below the boiling point of water before becoming mixed with the vapors of the entraining liquid or liquids) into a vessel up which the vapors of the entraining liquid or liquids are caused to rise; by this means the anhydride may be substantially condensed and the water vapor carried away with the vapors of the entraining liquid or liquids. Examples of entraining liquids which I may use for such method of condensation are benzene, carbon tetrachloride, petrol, mixtures of two or more of such bodies, or mixtures of ether with petroleum ether; it will be understood, however, that any other liquids chemically inert to the anhydride and having a high entraining capacity for water may be employed. The liquid should preferably have a low entraining capacity for the anhydride. Entraining liquids such as toluol, xylenes or other "entraining liquids" whose boiling points are intermediate between those of water and of the anhydride, are especially suitable for this method of separation.

Or, again for instance, the reaction gases or vapors may be subjected to condensation by the process described in U. S. application S. No. 285,613 filed June 15, 1928, that is to say they may be subjected to condensation by leading them under the surface of an "extracting" liquid cooled down or otherwise kept at temperatures below (and preferably considerably below) the boiling point of water. By the term "extracting liquid" is meant a liquid or liquid mixture in which the anhydride is soluble and which is chemically inert to the anhydride and insoluble or substantially insoluble in water. As examples of such "extracting" liquids may be mentioned benzene, chloroform and mixtures of ethyl ether or chloroform with one or more hydrocarbons such as light paraffins, gasoline, kerosene, benzol or its homologues. It is preferable to use as "extracting" liquids, liquids of the character referred to which are themselves hydrocarbons or which contain hydrocarbons, for example, benzene or mixtures of ethyl ether or chloroform with one or more hydrocarbons such as paraffins (particularly the petroleum fraction of boiling point 40° to 70° C. termed petroleum ether), gasoline (boiling point 70° to 90° C.), kerosene, benzol or its homologues. The following particular examples of "extracting" liquids are very suitable:— ether in admixtures with petroleum ether, chloroform mixed with petroleum ether and/or gasoline; and mixtures of ether and petroleum ether containing about 30 to 50% petroleum ether are especially suitable.

Or again, for instance, the reaction vapors may be treated by the process described in my U. S. application S. No. 242,977 filed December 27, 1927, that is to say they may be passed over or otherwise in contact with one or more "water binding" substances maintained at a temperature or temperatures below (and preferably substantially below) the temperature at which the reaction vapors are produced. By such treatment the water vapor may be substantially absorbed from the reaction vapors. In such treatment the water binding substances are preferably maintained at temperatures above the boiling point (under the conditions of pressure obtaining) of water to avoid condensation of water and resulting risk of loss of anhydride through hydrolysis, and for the best functioning of the treatment the water binding substances should be employed at temperatures above the boiling point of the anhydride in which case the water can be substantially absorbed and the anhydride pass on in vapor form. The term "water binding" substances means bisulphates, pyrosulphates (especially bisulphates and pyrosulphates of the alkali and earth alkali metals), zinc chloride, calcium chloride, orthophosphoric acid, pyrophosphoric acid, metaphosphoric acid and like substances which have affinity (and preferably high affinity) for water but excluding substances having a deleterious effect on aliphatic acids or anhydrides such as sulphuric acid.

Or again, for instance, the reaction vapors may be subjected to condensation by the process described in previous U. S. application S. No. 330,577 filed January 5, 1929, that is to say they may be caused to impinge upon a flowing stream of benzene (or other water insoluble solvent for the anhydride) whereby the gases or vapors are quickly cooled and condensed and the anhydride separated from the water. The benzene (or other solvent) so employed may be collected and the water layer (usually the lower layer) which separates out may be removed and the benzene (or equivalent) layer distilled to recover the anhydride.

In cases where the thermal decomposition of the aliphatic acid vapor is performed under pressure higher than atmospheric it is preferable, prior to subjecting the reaction gases or vapors to treatment for recovery or separation of the anhydride, to pass the reaction gases or vapors through one or more reducing valves or like apparatus in order to reduce the pressure substantially to atmospheric.

It is to be understood that the invention is not limited as to the strength of aliphatic acid employed. The process can be performed even with the vapors of dilute acids; and besides affording a ready means for the manufacture of anhydrides from concentrated or highly concentrated acids, it affords valuable means for producing anhydrides from waste or dilute acids, especially waste or dilute acids such as result from the acetylation of cellulose or other industrial acetylation processes.

The following example serves to illustrate a convenient form of execution of the invention it being understood that it is given solely by way of example.

*Example*

A mixture of the vapors of phenol and acetic acid, containing about 5% of phenol is passed in a rapid stream through an earthenware tube which is filled with balls or stones of pumice and heated to a temperature between 400° and 600° C. The vapors leaving the heated tube are subjected to fractional condensation by leading them upwards through one or more fractionating columns maintained at a temperature or temperatures intermediate between the boiling points of acetic anhydride and of water, whereby the anhydride is substantially condensed and the water allowed to pass on in vapor form.

What I claim and desire to secure by Letters Patent is:—

1. Process for the manufacture of an aliphatic anhydride, which comprises subjecting the vapor of an aliphatic acid to thermal decomposition in presence of at least one body selected from the group consisting of phenols of the benzene series and their lower aliphatic acid esters.

2. Process for the manufacture of an aliphatic anhydride, which comprises subjecting the vapor of an aliphatic acid to thermal decomposition in presence of a monohydric phenol of the benzene series.

3. Process for the manufacture of an aliphatic anhydride which comprises subjecting the vapor of an aliphatic acid to thermal decomposition in presence of phenol.

4. Process for the manufacture of an aliphatic anhydride, which comprises subjecting the vapor of an aliphatic acid to thermal decomposition in presence of a lower aliphatic acid ester of a monohydric phenol of the benzene series.

5. Process for the manufacture of an aliphatic anhydride, which comprises subjecting the vapor of an aliphatic acid to thermal decomposition in presence of a lower aliphatic acid ester of phenol.

6. Process for the manufacture of an aliphatic anhydride, which comprises subjecting the vapor of an aliphatic acid to thermal decomposition in presence of phenol acetate.

7. Process for the manufacture of an aliphatic anhydride, which comprises subjecting to thermal decomposition a vaporous mixture comprising an aliphatic acid and a monohydric phenol of the benzene series, said mixture containing between 1 and 10% of said body.

8. Process for the manufacture of an aliphatic anhydride, which comprises subjecting to thermal decomposition a vaporous mixture comprising an aliphatic acid and a lower aliphatic acid ester of phenol, said mixture containing between 1 and 10% of said ester.

9. Process for the manufacture of an aliphatic anhydride, which comprises subjecting to thermal decomposition a vaporous mixture comprising an aliphatic acid and phenol, said mixture containing between 1 and 10% of phenol.

10. Process for the manufacture of an aliphatic anhydride, which comprises subjecting to thermal decomposition, at temperatures of about 300 to 700° C., a vaporous mixture comprising an aliphatic acid and 1 to 10% of phenol.

11. Process for the manufacture of an aliphatic anhydride which comprises subjecting a vaporous mixture of an aliphatic acid and phenol containing 5% phenol to thermal decomposition at a temperature between 400° and 600° C.

12. Process for the manufacture of acetic anhydride, which comprises subjecting the vapor of acetic acid to thermal decomposition in presence of at least one body selected from the group consisting of phenols of the benzene series and their lower aliphatic acid esters.

13. Process for the manufacture of acetic anhydride, which comprises subjecting the vapor of acetic acid to thermal decomposition in presence of a monohydric phenol of the benzene series.

14. Process for the manufacture of acetic anhydride which comprises subjecting the vapor of acetic acid to thermal decomposition in presence of phenol.

15. Process for the manufacture of acetic anhydride, which comprises subjecting the vapor of acetic acid to thermal decomposition in presence of a lower aliphatic acid ester of a monohydric phenol of the benzene series.

16. Process for the manufacture of acetic anhydride, which comprises subjecting the vapor of acetic acid to thermal decomposition in presence of a lower aliphatic acid ester of phenol.

17. Process for the manufacture of acetic anhydride, which comprises subjecting the vapor of acetic acid to thermal decomposition in presence of phenol acetate.

18. Process for the manufacture of acetic anhydride, which comprises subjecting to thermal decomposition a vaporous mixture comprising acetic acid and a body selected from the group consisting of monohydric phenols of the benzene series and their lower aliphatic acid esters, said mixture containing between 1 and 10% of said body.

19. Process for the manufacture of acetic anhydride, which comprises subjecting to thermal decomposition a vaporous mixture comprising acetic acid and phenol acetate, said mixture containing between 1 and 10% of the phenol acetate.

20. Process for the manufacture of acetic anhydride, which comprises subjecting to thermal decomposition a vaporous mixture comprising acetic acid and phenol, said mixture containing between 1 and 10% of phenol.

21. Process for the manufacture of acetic anhydride, which comprises subjecting to thermal decomposition, at temperatures of about 300 to 700° C., a vaporous mixture comprising acetic acid and 1 to 10% of a body selected from the group consisting of phenol and its lower aliphatic acid esters.

22. Process for the manufacture of acetic anhydride which comprises subjecting a vaporous mixture of acetic acid and phenol containing 5% phenol to thermal decomposition at a temperature between 400° and 600° C.

HENRY DREYFUS.